March 6, 1934.  W. LAABS  1,950,360
PROCESS FOR RENDERING FATTY MATERIALS
Filed Aug. 29, 1921
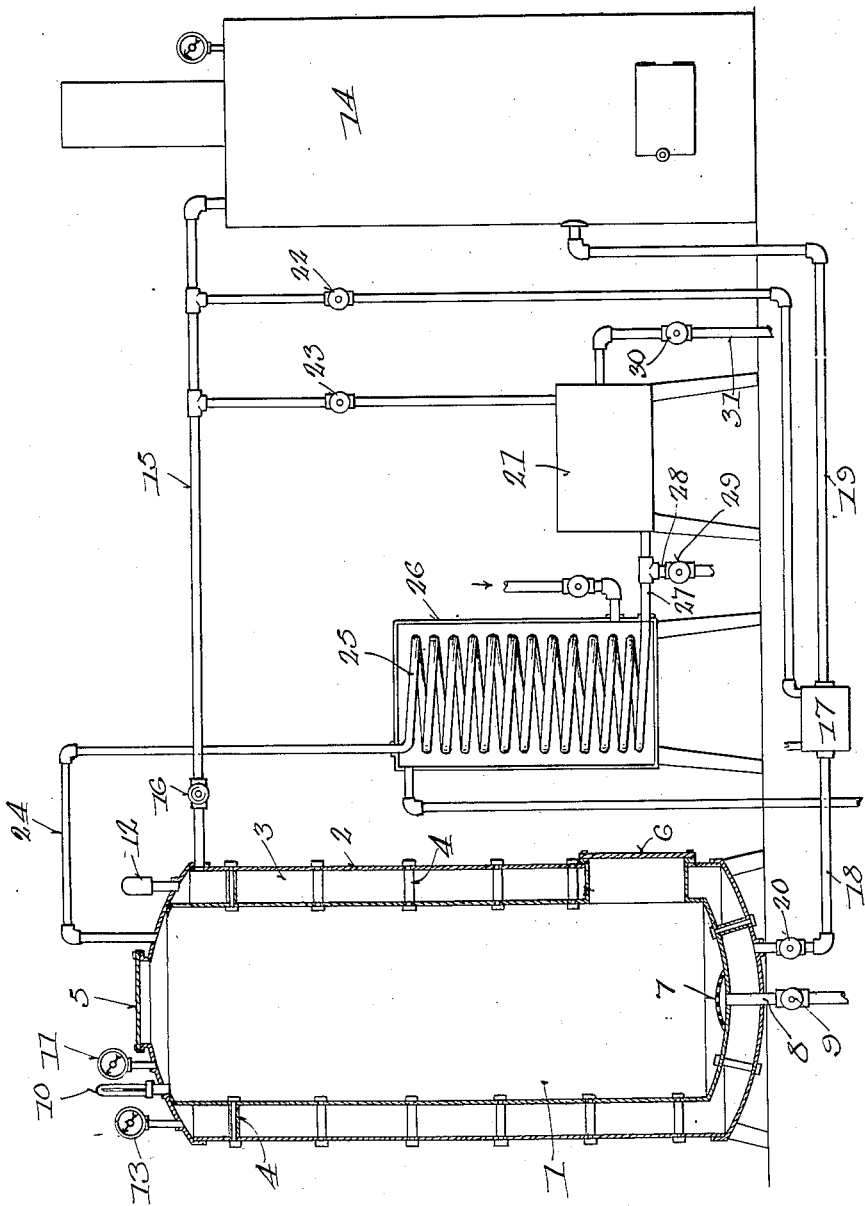
William Laabs INVENTOR.
BY Erwin Wheeler & Woolard
ATTORNEYS.

Patented Mar. 6, 1934

1,950,360

UNITED STATES PATENT OFFICE 1,950,360

PROCESS FOR RENDERING FATTY MATERIALS

William Laabs, Racine, Wis., assignor, by mesne assignments, to Packers Equipment Development Company, Chicago, Ill., a corporation of Illinois Application August 29, 1921, Serial No. 496,276

4 Claims. (Cl. 87—13)

This invention relates to a process for treating animal matter such as refuse from slaughterhouses, dead animals, and similar material.

Objects of this invention are to provide a process for treating animal matter whereby oils, greases, etc. may be readily extracted; to provide a process in which moisture is not added to the animal material during treatment; to provide a process in which agitation of the material being treated is not necessitated; and to provide a process for treating refuse from slaughterhouses or parts of dead animals without necessitating preliminary treatment such as grinding or otherwise finely dividing the material.

Further objects are to provide a process for treating animal material whereby the temperature and pressure are so controlled as to facilitate the separation of the oils, greases, etc. by gravity from the other portions of the material being treated; to provide such a process whereby the glues, fiber and other material of the more viscous nature are retained in the apparatus while the oils or greases are drawn off; and to provide such a process whereby the remaining material after the removal of the greases and oils is particularly suitable for further treatment for fertilizers or stock foods.

Further objects are to provide an apparatus in which the temperature of the material under treatment may be readily controlled; in which the pressure applied to the material may be readily controlled; and to provide an apparatus which is extremely economical in use of fuel; and which does not saturate the material with water during the treating process, thereby avoiding a large portion of the waste usually incurred in rendering processes.

An apparatus embodying the invention and suitable for carrying out the process is diagrammatically illustrated in the single view shown in the accompanying drawing.

In practicing the process forming the subject matter of this invention, the material is subjected to heat and pressure of predetermined or controlled values without passing steam or moisture into such heated material while the material is being so treated. The gases and water vapor which are given off during this treatment are gradually withdrawn in such amounts that the pressure of the vapors surrounding the material is maintained substantially constant. These gases and water vapor are removed and condensed and thereafter discharged into sewers. After the material practically ceases giving off water vapor and gases, the pressure thereon is gradually lowered by substantially completely withdrawing all of the gases and water vapor from contact with the heated material. This may be carried only to atmospheric pressure if desired or may be carried below atmospheric pressure under certain conditions depending upon the material to be treated.

It has been found that while the material is being so treated the glues and fiber will cake together or adhere more or less to the solid part of the material and to the walls of the vessel in which the material is treated and to each other without, however, making a completely impervious gummy mass. It has also been found that the oils, greases and similar substances gradually settle to the bottom of the receptacle and pass freely from the glues and fiber.

After the pressure has been relieved the oils, greases, etc. are drained from the lower portion of the mass of treated material and it will be found that such oils, greases, etc. are substantially free from glue, water and other foreign matter. After the oils, greases, etc. have been removed, the remaining material is immediately withdrawn from the receptacle and allowed to cool.

It is to be particularly noted that by this process the oils, greases, etc. are practically pure and are not mixed with a quantity of water as in the usual rendering processes. It is also to be noted that the remaining material is rich in glues, phosphates, ammonia, and other materials which are usually driven off where steam is admitted directly to the material as in the usual rendering processes. These remaining materials are therefore eminently suitable for fertilizing or in the preparation of stock foods as the soluble salts, phosphates, nitrates, etc. are retained and as the glues, fibers, etc. are also in substantially the same quantities that they existed in the original material.

An apparatus which is suitable for carrying out this process is illustrated in the accompanying drawing. The chamber 1 in which the material is treated, may be an elongated cylindrical boiler-like member. This receptacle or chamber is surrounded by a casing 2 to provide a jacket or space 3 between the inner and outer shells. It is found expedient to stay-bolt these shells together as indicated at 4 at suitably spaced points so that when the pressure is reduced within the inner receptacle the pressure between the inner and outer members will not collapse the inner receptacle. This inner receptacle is jacketed on its bottom and vertical sides. The top, however, may be unjacketed as indicated in the drawing. The top of the receptacle is provided with a charging door 5 which may be bolted or otherwise secured in position after the charge has been placed within the receptacle. It is also provided with an outlet door 6 through which the material remaining after the treatment may be readily withdrawn. This door also is provided with any suitable means for securing it in place and providing an air-tight joint. The lower portion of the receptacle 1 is provided with a bottom, upwardly bulging, perforated member 7 immediately below which is located the outlet pipe 8 for the oils, greases, etc., this pipe being provided with a suitable valve 9. A thermometer 10 and a pressure gage 11 communicate with the interior of the receptacle 1 and may conveniently be located at the top as indicated in the drawing.

A safety valve 12 is placed in communication with the outer receptacle so as to limit the pressure which may be carried between the two shells. A pressure gage 13 is also provided for this jacket so that the pressure of the steam may be accurately determined and consequently the temperature at which the walls of the inner receptacle are maintained.

A boiler 14 is provided for supplying steam to the jacket by means of the steam main 15, the flow of steam being conveniently controlled by means of a cut off valve 16. This boiler also supplies steam for a force pump or boiler feed pump 17 which is adapted to withdraw condensed water from the steam jacket by means of the pipe 18 and deliver such condensed heated water to the boiler through the pipe 19, a suitable cut off valve 20 being provided in this pipe line. The boiler also supplies steam for a vacuum pump 21 whose purpose will later be described. Both of pumps 17 and 21 are controlled by suitable cut off valves 22 and 23 respectively.

A pipe 24 leads from the upper portion of the chamber 1 to the coils 25 of a condenser 26. The lower end of these coils leads outwardly into a pipe 27 and may discharge into sewers by means of a pipe 28 when the cut off valve 29 is open. If it is desired to reduce the pressure in the chamber 1 below atmospheric, as described for the end of the process under one condition of operation, the vacuum pump 21 may be operated and the cut off valve 29 closed. In this case, the cut off valve 30 is open and the material drawn outwardly by such vacuum pump is discharged into the sewers by means of a pipe 31.

The operation of the device may be briefly summarized as follows: The receptacle 1 is first charged with the material to be treated. Thereafter, the doors 5 and 6 are clamped in closed position, thereby sealing the receptacle from communication with the external air. Steam is now admitted to the jacket 3. Any water of condensation in such jacket may be withdrawn by the pump 17 and forced into the boiler, thereby supplying the boiler with uncontaminated hot water. The pressure is allowed to rise in the casing 3 until it reaches a predetermined point which may be in some cases about eighty pounds. The pressure is maintained at this point by properly regulating the valve 16. Gases and water vapor will now be given off from the material and the pressure within the receptacle 1 will be seen to gradually rise by observing the gage 11. When the pressure within the inner receptacle has reached a predetermined value, the gas is allowed to slowly escape at such a rate as to maintain this predetermined pressure throughout substantially the entire process. After gases and water vapor have ceased to be given off, the pressure and temperature are allowed to gradually fall in the receptacle 1. It is to be noted that violent disturbances within the receptacle 1 are prevented because of the gradual reduction of pressure and temperature and consequently the oil is not suddenly lifted by rapidly forming steam and mixed with the material within the receptacle 1, but is allowed to gradually settle freely to the bottom portion of such receptacle. After the pressure has been completely relieved within the receptacle 1, the drain valve 9 may be opened and the oils, greases, etc. may then be withdrawn. Immediately after this, the outlet door 6 is open and the remaining material withdrawn from the receptacle 1. The steam between the walls of the device herein disclosed makes it possible to build up pressures within the receptacle 1 which exceed those ordinarily used and would be dangerous in most vats. For example, I prefer to use for the reduction of garbage an initial jacket pressure of 40# of steam. Over a period of two hours I gradually increase the jacket pressure to 110# and, by controlling valve 16, I permit a gradual increase in the temperature of the garbage from 267° F. to 334° F., corresponding respectively to 25 lb. and 95 lb. gauge pressure within receptacle 1. Thereafter, for the ensuing four hours, I reduce the pressure within receptacle 1 to a vacuum of 20 inches, and reduce the temperature of the garbage down to 170° F.

Similarly tallow, lard, etc. are reduced at temperatures of 227° F. to 302° F. for one hour and temperatures of approximately 292° F. for one and one-half hours.

Carcasses of dead animals, including bones, in practice are, in the process and apparatus above described, completely reduced in a total of approximately five and a half hours when they are subjected to temperatures varying from 250° F. to 311° F. for four hours and 165° F. for one and a half hours.

Even green hard bones may be reduced without previous crushing if treated for two hours at 267° F. to 311° F. and for two hours at 160° F.

It will thus be seen that a process has been provided for rendering material in which the material is not saturated with water vapor, but in which the material is kept separate from the heating stream. It will also be seen that a very efficient process has been provided as a minimum amount of fuel is required to operate the apparatus and as the resulting materials are not carried off by the outwardly flowing heating steam as in the former processes of rendering. It will also be seen that the process may be very rapidly and expeditiously followed.

It is to be understood that while the term oils, greases, etc. is used throughout the description and claims that these terms either separately or together are intended to induce oils, greases, tallow, and other materials of a similar nature.

I claim:

1. The process of preparing materials containing nitrogen compounds or proteins, for fertilizer or stock food purposes, consisting in digesting the materials in a closed steam tight container subjected to heat, in moist steam derived substantially entirely from the moisture contained in said materials, releasing the steam after digestion is completed, reducing the pressure of steam in the container below that of the atmosphere to cause the removal of a further amount of moisture from the materials treated.

2. The process of rendering solid materials containing animal fats and oils which comprises the steps of digesting the same in a closed heated vessel with steam pressures substantially above atmospheric pressures derived substantially entirely from the moisture contained in said material to substantially disintegrate the solid structure thereof, subsequently eliminating excess moisture by venting steam from said vessel while maintaining digesting pressures, and thereafter heating the disintegrated mass in the vessel at sub-atmospheric pressures to cause separation of the clear fats and oils from the solid residue.

3. The process of rendering solid materials containing oils and fats of animal origin which comprises the steps of subjecting the same to steam pressures derived substantially entirely from moisture contained in the material substantially above atmospheric pressure in a closed heated vessel until the mass is substantially disintegrated; subsequently eliminating excess moisture by venting steam from said vessel while maintaining digesting pressures and thereafter reducing the pressures in the vessel below atmospheric pressure by exhausting the moisture therefrom and reducing the temperatures of the material until the clear fats and oils are separated from the residue free of gluey substances.

4. The process of rendering solids containing fats and oils of animal origin; which comprises the steps of heating the same in a closed vessel by the application of indirect heat to generate steam from the moisture contained therein; retaining the generated steam in said vessel to cause the building up of pressures substantially above atmospheric pressures until the solid structure of the material is substantially disintegrated; subsequently venting said vessel to remove excess moisture while maintaining disintegrating pressures, reducing the pressure of steam in the vessel below that of the atmosphere to cause the removal of a further amount of moisture from the material treated, then permitting the fats and oils to separate from the solids uncontaminated by glues or mucilaginous constituents of the solids, and draining the free fats.

WILLIAM LAABS.